F. MÜLLER.
METHOD OF MAKING THREAD MILLING HOBS.
APPLICATION FILED FEB. 1, 1919.
1,348,305.
Patented Aug. 3, 1920.
6 SHEETS—SHEET 1.
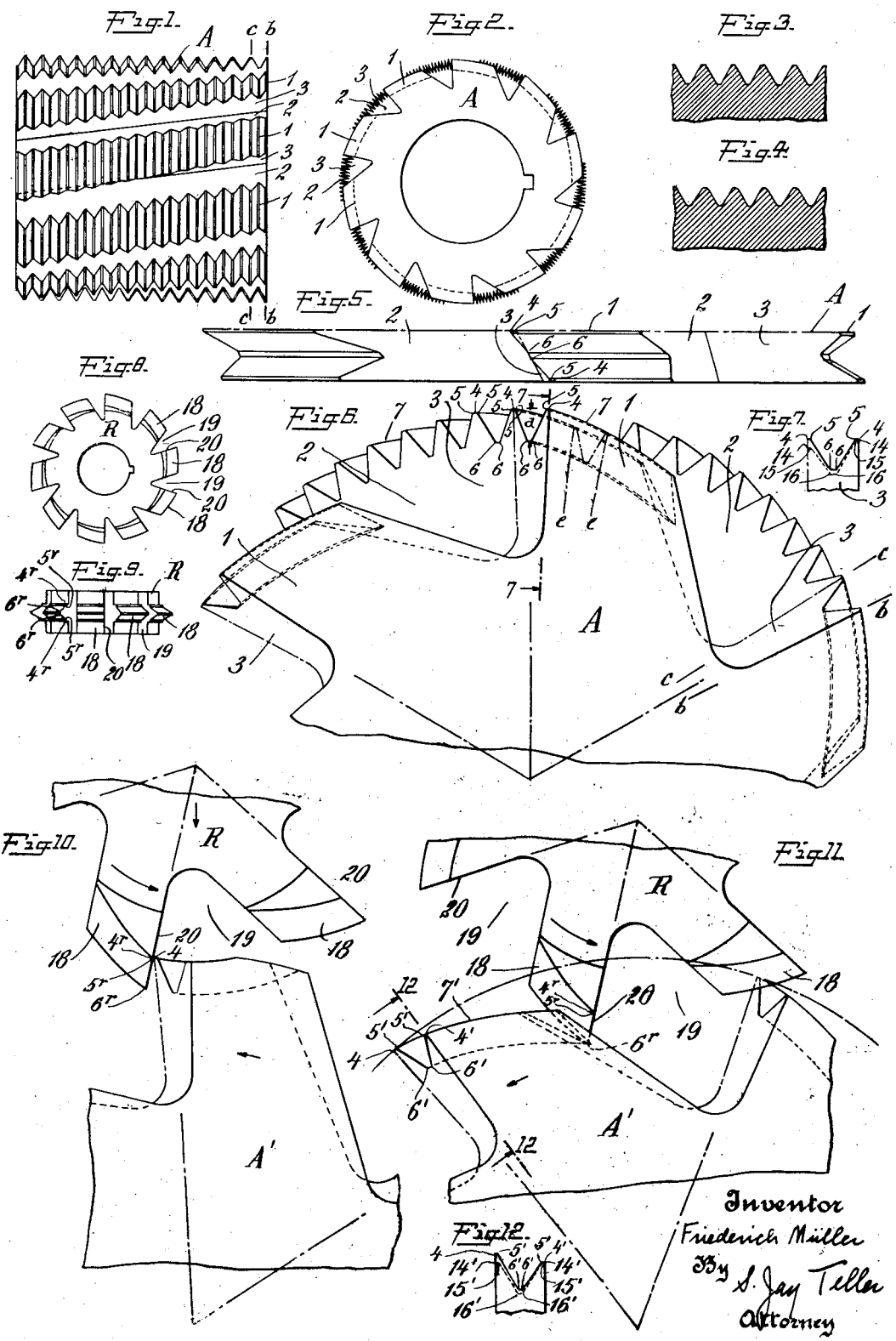
Inventor
Friederich Müller
By S. Jay Teller
Attorney F. MÜLLER.
METHOD OF MAKING THREAD MILLING HOBS.
APPLICATION FILED FEB. 1, 1919.
1,348,305. Patented Aug. 3, 1920.
6 SHEETS—SHEET 2.
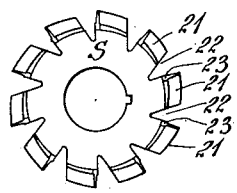
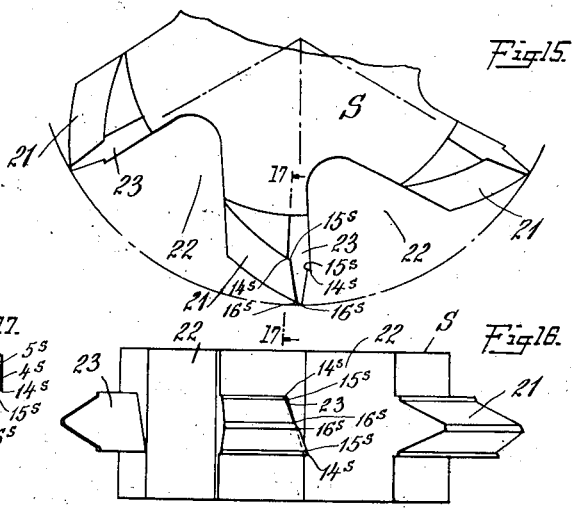
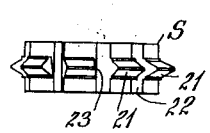
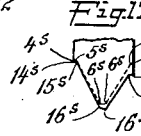
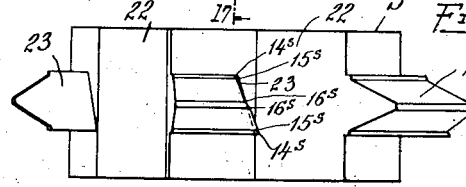
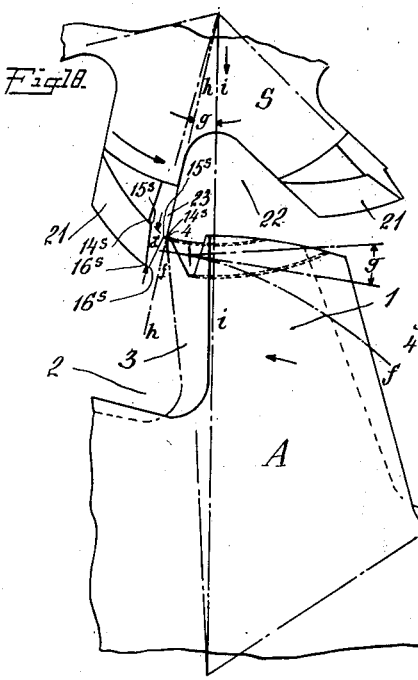
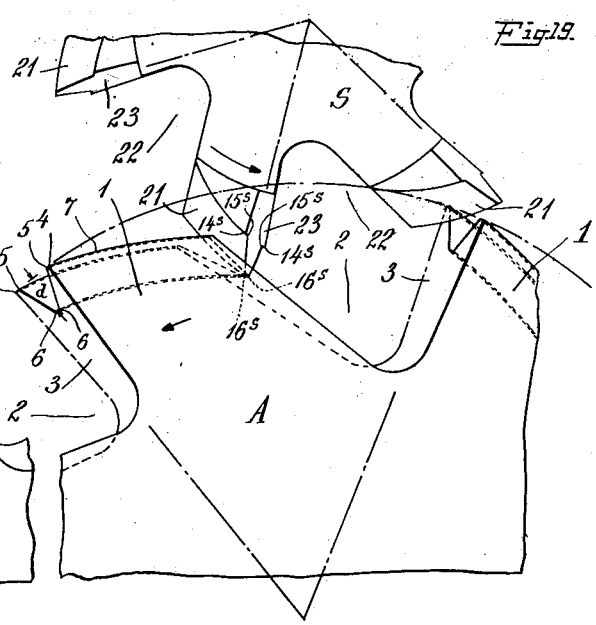
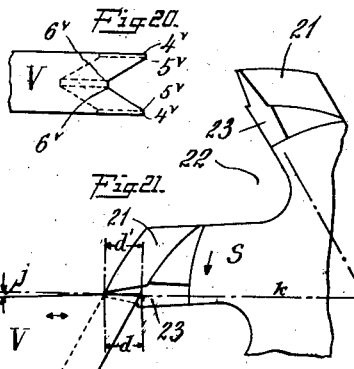
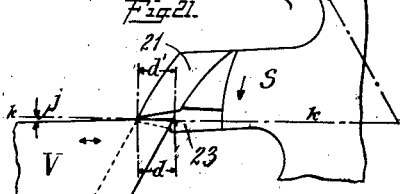
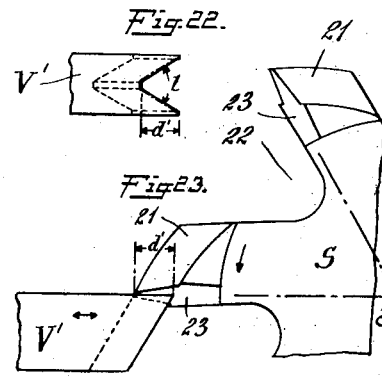

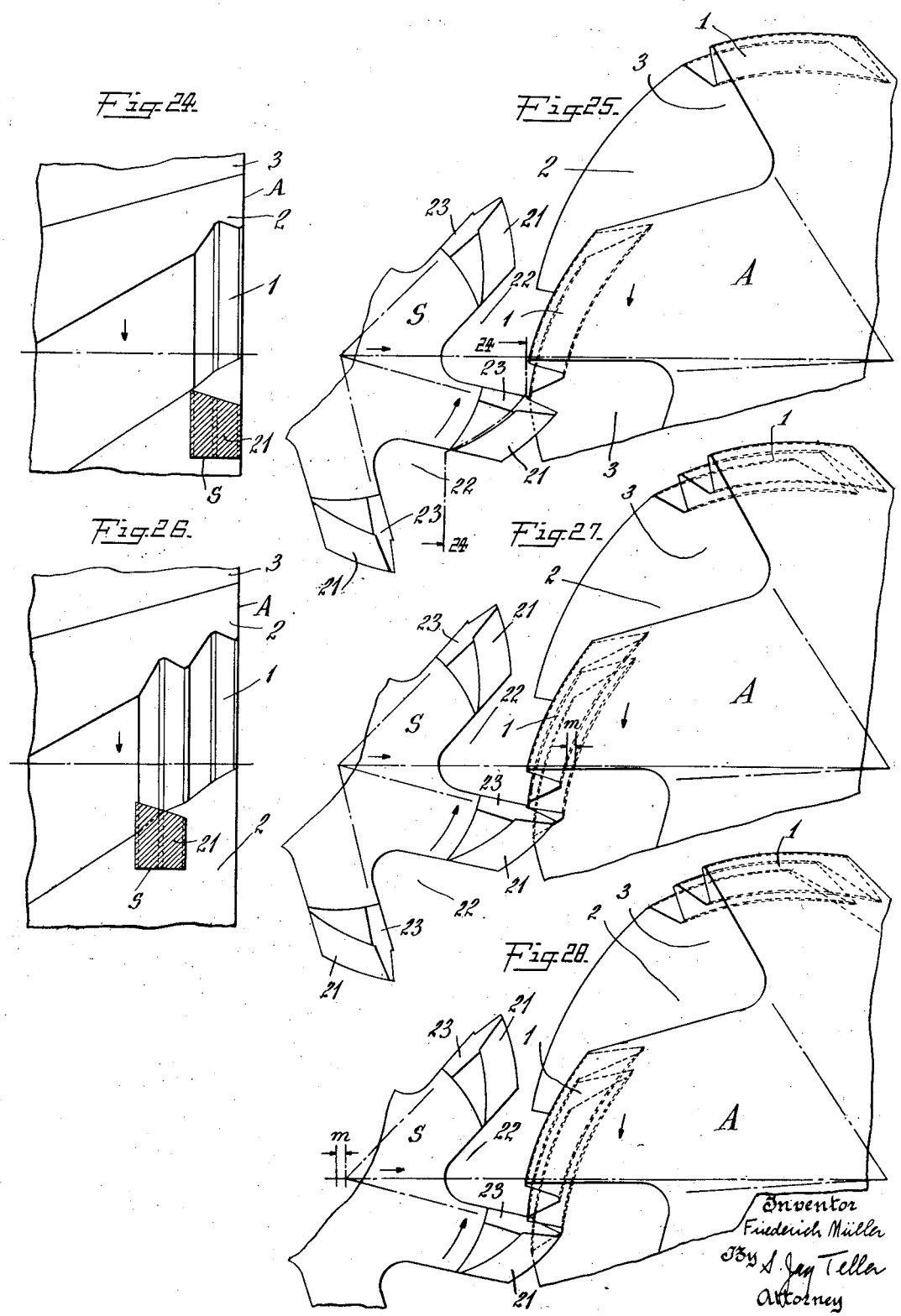

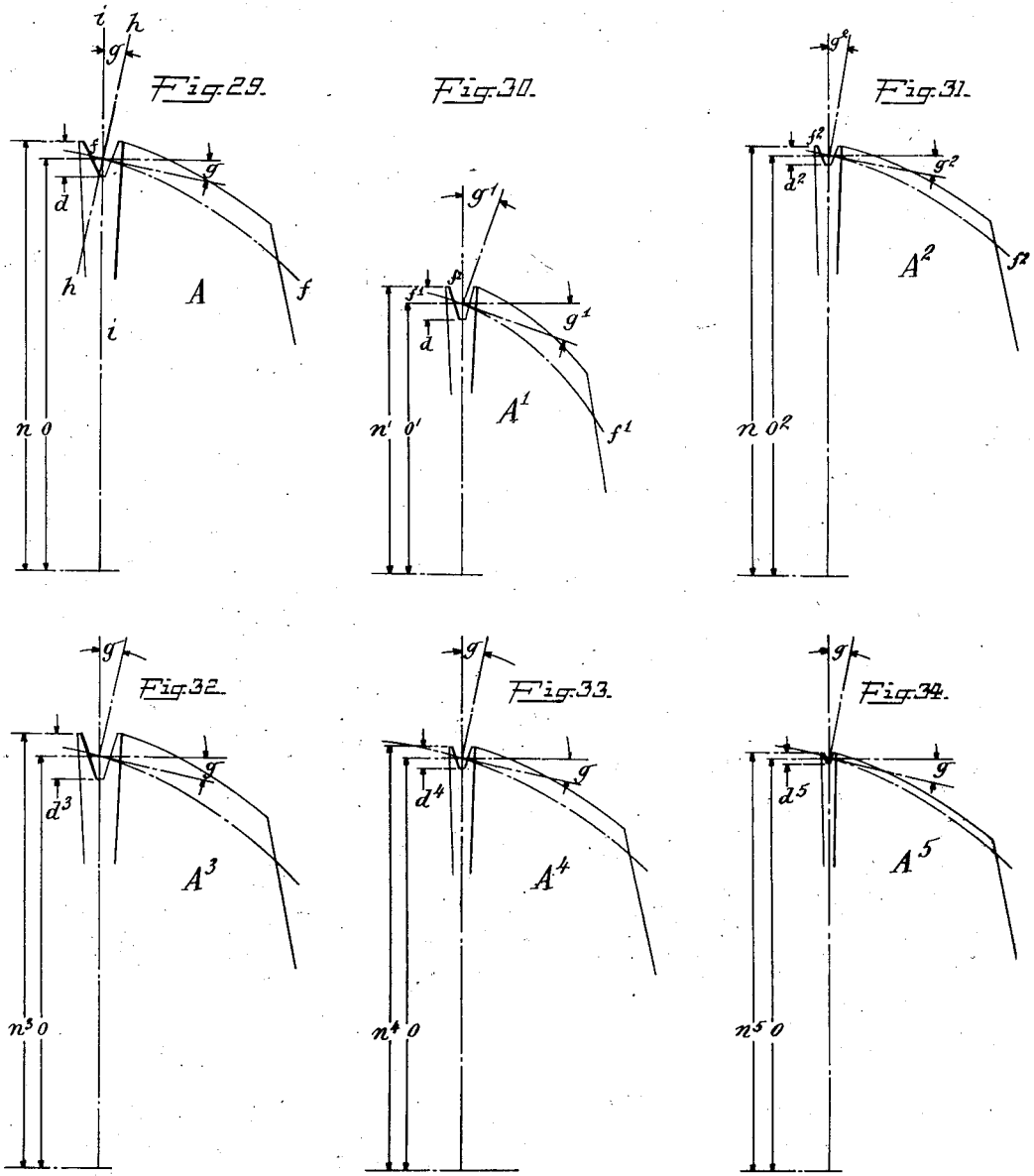

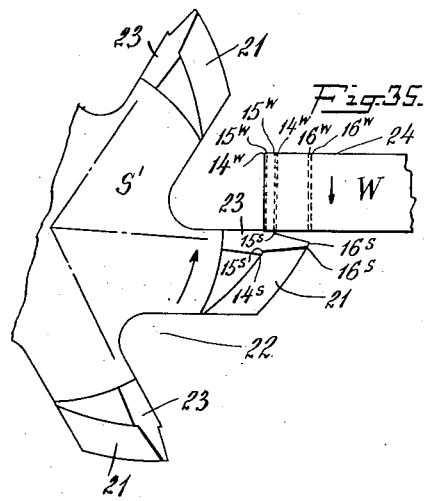
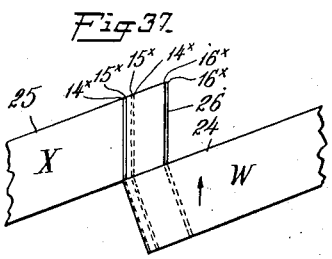
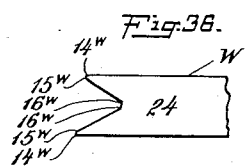
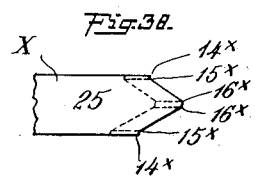
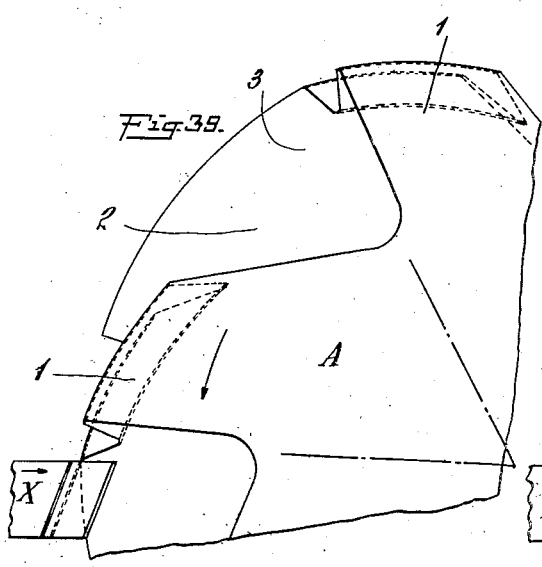
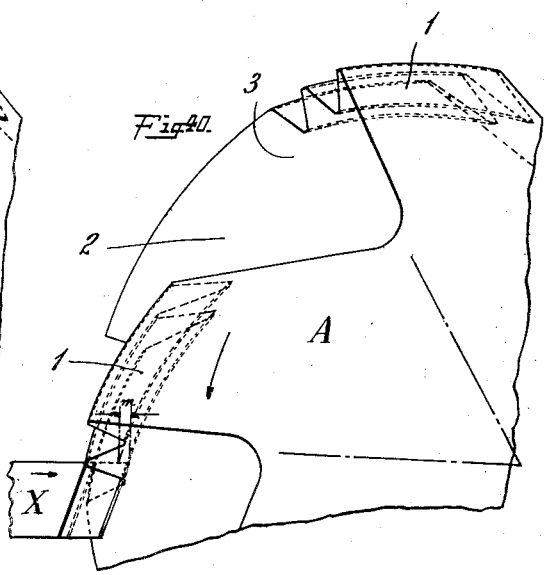

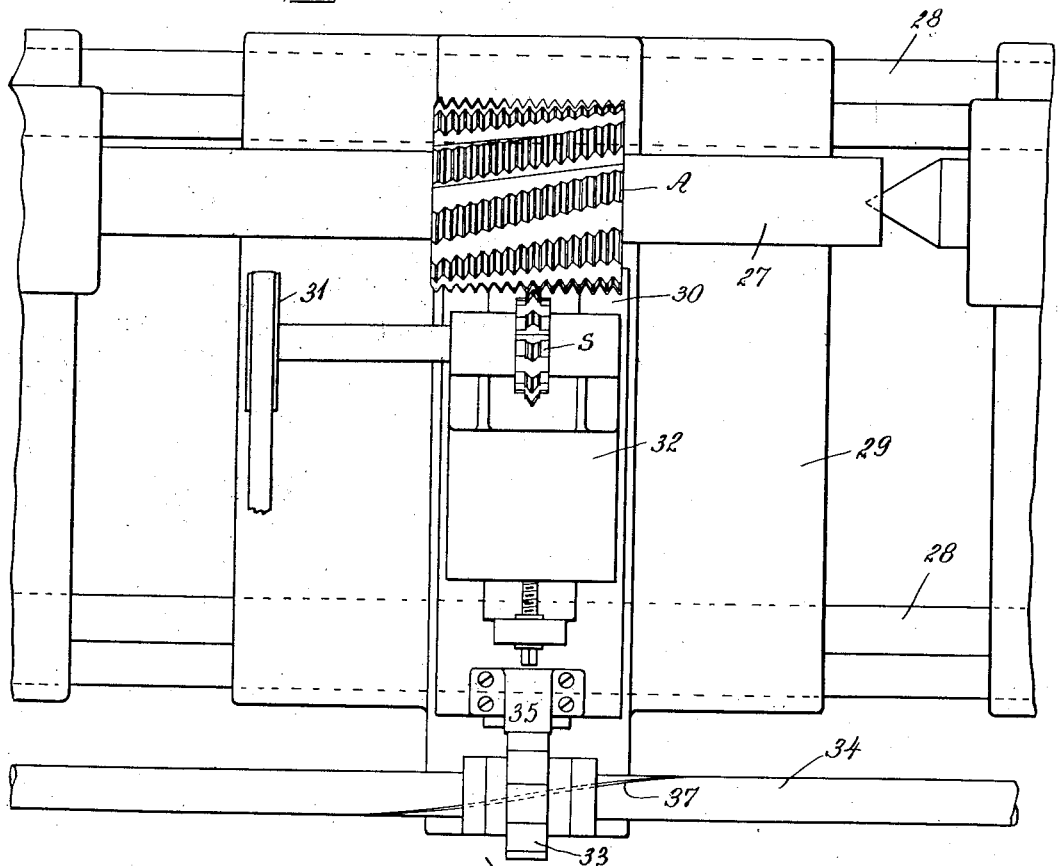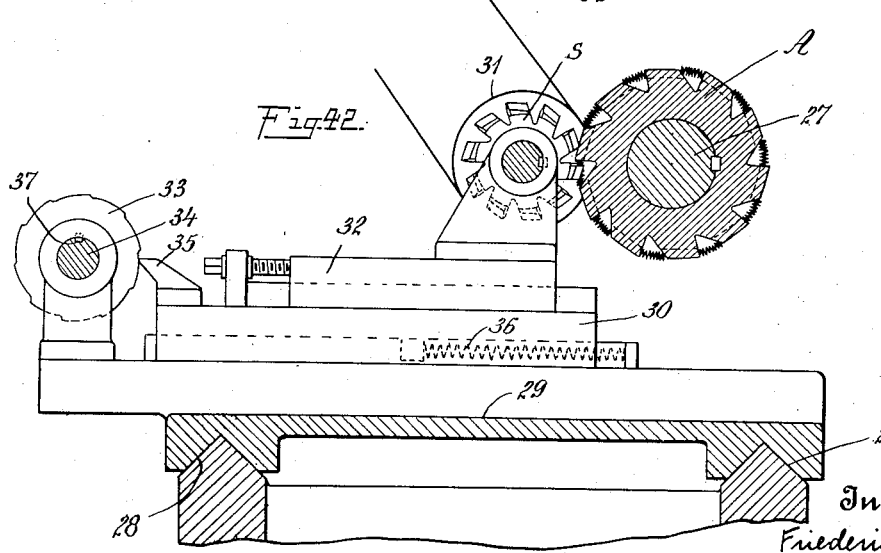

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING THREAD-MILLING HOBS.

1,348,305.   Specification of Letters Patent.   Patented Aug. 3, 1920.

Application filed February 1, 1919. Serial No. 274,530.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Thread-Milling Hobs, of which the following is a specification.

The invention relates to a method of making milling cutters which are adapted to cut a series of uniformly spaced similar grooves. The best example of a cutter of this type is a hob such as is used for milling threads, the threads being completely cut during a single revolution of the part being threaded. A milling cutter or hob such as that referred to is adapted to cut a composite contour which consists of a number of equal elemental contours arranged at uniform distances. I will herein refer to cutters adapted to be made in accordance with the invention as thread milling hobs but it will be understood that the invention in its broader aspects is not so limited.

A hob adapted to be made in accordance with the present invention is in many respects similar to the milling cutter set forth in my copending application for milling cutters, Serial No. 268,349, filed December 26, 1918. The hob itself is set forth in my copending application Serial No. 274,529, filed on even date herewith. As pointed out in the said applications, it is advantageous to provide milling cutters with cutting edges which are inclined with respect to the cutter axis so as to enable each of the successive teeth to engage the work gradually and to effect a shearing cut. This inclination of the cutting edges is important not only for cutters which are of uniform diameter throughout or which have a uniform taper, but also for formed or contour cutters in which the diameter varies from end to end in ways differing from a uniform taper, such cutters being those adapted to cut a predetermined contour other than a straight line.

The inclination of the cutting edges is particularly important in the case of thread milling hobs which are frequently of considerable length and which have a large number of thread cutting points at equal distances from the cutter axis. According to prior practice, thread milling hobs have been made with their cutting faces parallel with the axis; that is, with the cutting points of each row so arranged that they all engage the work at the same time, thus causing much shock and vibration. To reduce the shock and vibration as much as possible the hobs have been run at a slow speed, but even at the slow speed the hobs have worn rapidly and there has been a marked tendency toward rough and uneven cutting.

In accordance with the invention set forth in my said application, Serial No. 274,529, I have provided a hob having the cutting faces inclined with respect to the axis so that the cutting points of each row engage the work successively, the cutting action beginning at one end and being transferred from tooth to tooth in succession until the other end is reached. This form of hob practically eliminates shock and vibration and enables me to greatly increase the speed of cutting. In addition, I find that because of the absence of shock the wear on the hob is greatly reduced and the work is given a much smoother finish than was heretofore possible.

The principal object of the invention is to provide a method of making a milling cutter or thread milling hob which is adapted to accurately cut a predetermined composite contour such as a thread contour and which has its cutting edges longitudinally inclined with respect to the cutter axis for the purpose set forth and which is properly relieved. The method is in part similar to that presented in my copending application for methods of making milling cutters, Serial No. 268,350, filed December 26th, 1918, and in part similar to the method presented in my copending applications for methods of making milling cutters, Serial No. 248,190, filed August 3rd, 1918, and Serial No. 326,875, filed Sept. 27th, 1919. A further object of the invention is to provide a system for making a series of similar thread milling hobs of the type described.

As to a part of its subject matter, this application constitutes a continuation of my abandoned application for methods of making milling cutters with spiral cutting faces, Serial No. 188,083, filed August 25th, 1917.

In order that my novel method may be clearly understood, I have shown in the accompanying drawings a thread milling hob embodying the invention set forth in the aforesaid application Serial No. 274,529, and I have illustrated several ways in which the method may be practised. It will be understood, however, that the drawings are for illustrative purposes only and are not to be construed as defining or limiting the scope of the invention, the accompanying claims being relied upon for that purpose.

Of the drawings:

Figures 1 and 2 are side and end views respectively of a thread milling hob such as may be made in accordance with the invention.

Figs. 3 and 4 are diagrammatic views illustrating different forms of threads.

Figs. 5 and 6 are enlarged diagrammatic plan and end views respectively of the hob. In these views there is shown a smaller number of teeth and the inclination of the cutting faces and the relief are considerably increased in order to bring out the principles of the invention more clearly. Fig. 6 shows the entire length of the hob, whereas Fig. 5 shows a section thereof between the lines b—b and c—c of Figs. 1 and 6.

Fig. 7 is a diagrammatic view illustrating certain features of the hob section shown in Figs. 5 and 6.

Figs. 8 and 9 are end and bottom views respectively of a preliminary milling cutter of the general type which may be used for milling the hob.

Fig. 10 is a diagrammatic view, on the same scale as Figs. 5 and 6, illustrating the preliminary cutter in use for milling a section of a blank for the hob, the milling operation having been started but not finished.

Fig. 11 is a view similar to Fig. 10 but showing the section of the blank completely milled.

Fig. 12 is a diagrammatic view illustrating certain features of the incorrect hob section which results from the milling operation shown in Figs. 10 and 11.

Figs. 13 and 14 are end and bottom views respectively of a preliminary milling cutter similar to that shown in Figs. 8 and 9 but modified as required for the practice of the present invention.

Figs. 15 and 16 are enlarged diagrammatic end and bottom views respectively of the preliminary cutter shown in Figs. 13 and 14. The cutter is shown as having a smaller number of teeth and as having increased inclination and relief in conformity with the increased inclination and relief shown in Figs. 5 and 6.

Fig. 17 is a diagrammatic view illustrating certain features of the preliminary cutter shown in Figs. 15 and 16.

Fig. 18 is a view similar to Fig. 10 but illustrating the preliminary cutter shown in Figs. 15 and 16 in use for milling a section of a blank for the hob, the milling operation having been started but not finished.

Fig. 19 is a view similar to Fig. 18 but illustrating the blank completely milled.

Fig. 20 is a plan view of a lathe tool adapted to be used for shaping the preliminary milling cutter.

Fig. 21 is a diagrammatic view illustrating a method of shaping the preliminary milling cutter, use being made of the lathe tool shown in Fig. 20.

Fig. 22 is a view similar to Fig. 20, but illustrating a slightly different lathe tool.

Fig. 23 is a view similar to Fig. 21 but illustrating the forming of the preliminary milling cutter by means of the lathe tool shown in Fig. 22.

Fig. 24 is a diagrammatic fragmentary front view of a blank which is being milled. In this view one tooth of the preliminary milling cutter is shown in section along the line 24—24 of Fig. 25.

Fig. 25 is a diagrammatic fragmentary end view showing the preliminary milling cutter in operative relation with the blank, as illustrated in Fig. 24.

Fig. 26 is a view similar to Fig. 24 but showing the preliminary milling cutter and the blank in different relative positions.

Figs. 27 and 28 are views similar to Fig. 25 but showing the preliminary milling cutter and the blank in different relative positions.

Figs. 29 to 34 are fragmentary diagrammatic views of sections of hobs of different sizes and pitches, these views illustrating my improved system of making a series of similar hobs.

Figs. 35 and 36 are side and plan views respectively of an intermediate tool which may be used for making a lathe tool adapted to be used for cutting a hob. Fig. 35 illustrates a milling cutter in operative relation to the tool.

Fig. 37 illustrates the intermediate tool shown in Figs. 35 and 36 in use for making the lathe tool.

Fig. 38 is a plan view of the lathe tool.

Figs. 39 and 40 are diagrammatic views, similar respectively to Figs. 25 and 28 illustrating the lathe tool shown in Figs. 37 and 38 in use for cutting a hob.

Fig. 41 is a diagrammatic plan view of a machine adapted for carrying out the method.

Fig. 42 is a cross sectional view of the machine illustrated in Fig. 41.

In order that the method involving the invention may be clearly understood, I will first describe a hob such as may be made in accordance therewith.

Referring to the drawings, particularly to Figs. 1 to 7 thereof, A represents a thread milling hob embodying the invention set forth in my said application Serial No. 274,529. Such a hob may be made for cutting threads of any standard form and in Figs. 3 and 4 I have illustrated U. S. standard threads and Whitworth threads. For the sake of convenience and simplicity I have illustrated only U. S. standard threads in Figs. 1 and 2 and in the other figures, but it will be understood that there is no limitation of the invention on this account and that the thread contour may consist of straight lines or curves. Preferably in accordance with the standard thread forms each thread is symmetrical in outline as is also each groove between two threads.

The hob is provided with a plurality of generally longitudinal teeth 1 between which are grooves 2, the teeth and grooves being preferably spaced uniformly. The grooves 2 can be of any usual or preferred depth and shape, as required. The front wall 3 of each tooth constitutes a cutting face and this cutting face is radial or approximately so in order to provide a satisfactory cutting angle. Each tooth 1 is provided with a series of circumferentially extending ridges or tongues having grooves formed between them. The tongues with the grooves between them are so shaped and spaced as to correspond to the form and pitch of the threads to be cut. Preferably, as illustrated, the ridges or grooves of the several teeth are in circumferential register so as to follow the same paths when the hob is rotated.

In accordance with the invention, each cutting face 3 is inclined or positioned obliquely so that its longitudinal lines lie at angles to the axis of the cutter. Preferably, as shown, the entire teeth 1 are oblique or inclined and not merely the front cutting faces 3 thereof. Preferably each tooth 1 is generally helical in form, and each cutting face 3 conforms to a helicoid. As illustrated in Figs. 1, 2, 5 and 6, the helicoid is one formed by a generatrix following the axis of the cutter and also following a helix on a cylinder concentric with the axis thereof. The character of the helicoid may, however, be varied. The teeth and the cutting faces may be inclined in either direction and the degree of inclination may be varied as required.

Figs. 5 and 6 show the hob diagrammatically on an enlarged scale. Fig. 5 includes only a section of the hob extending from the line $b$—$b$ to the line $c$—$c$ as indicated in Figs. 1 and 6. It will be obvious that the complete hob comprises a series of sections such as that shown in Fig. 5 the respective inclined cutting faces of all of the sections joining and constituting continuous unitary cutting faces, as shown in Figs. 1, 2 and 6. The section presents a contour which is one of the number of equal elemental contours of which the composite contour of the hob consists.

As before stated, the tongues and the grooves between them correspond in form and spacing to the form and pitch of the threads to be cut. For the form of threads shown the tops of the tongues are provided with "flats," the bottoms of the grooves are provided with other "flats," and inclined surfaces are provided connecting the respective flats. Each elemental contour includes points 4, 5, 6, 6, 5 and 4, the depth of the contour being $d$. At the cutting faces 3 the outer flats 5—4—5 are all at the same distance from the axis, and in fact, all points along each flat are at the same distance from the axis. Similarly, the bottom flats 6—6 are all at the same distance from the axis; and all points along each flat are at the same distance from the axis. Similarly, each inclined line 5—6 connecting the flats is correctly positioned. In fact, the entire effective contour of each cutting face from one end of the hob to the other, is such that, when the hob is rotated, it will define the correct thread contour, one element of this contour being shown by full lines in Fig. 7. This correct effective contour obtains notwithstanding the fact that the cutting face is a warped or helicoidal surface.

Each tooth of the hob is relieved along lines 7 extending backward and inward from the cutting face in planes perpendicular to the hob axis. These relief lines form continuous surfaces which extend from end to end of the hob and which are properly constructed notwithstanding the variations in radius at different points along the thread outline and notwithstanding the variations in angular position resulting from the warped or helicoidal cutting face. The relief lines 7 are maintained in similar relationship to each other as they extend backward and inward, the lines preferably conforming to spirals of Archimedes in the said planes perpendicular to the axis. The result is that each tooth of the hob at any axial plane of intersection such as 7—7 has a distorted shape, as shown by dotted lines in Fig. 7. This distorted shape includes points 14, 15, 16, 16, 15 and 14 corresponding respectively to the points 4, 5, 6, 6, 5 and 4 of the outline of the cutting face. The distortion of shape results from the fact that the successive inward inclined relief lines 7 start at different angular positions because of the inclined or helicoidal cutting face. Therefore with the cutting face inclined in the direction illustrated the several points 15, 16, 16, 15 and 14 to the left of the point 4 or 14 are spaced inward from the respective points 5, 6, 6, 5 and 4 by progressively increasing distances. Notwithstanding this distortion in shape at an axial plane of intersection, the outline or effective contour at the cutting face is correct, as before stated.

The effective contour at the cutting face is correct, as stated, and this correct effective contour is maintained when the cutting faces 3 are ground backward. In order for this to be true, it is obviously necessary for the hob teeth to present the same shape at successive surfaces of intersection, the said surfaces being similar in form and position to the initial cutting faces 3. At any surface, such as e—e, back of an initial cutting face 3 and similar to the said face, the same effective contour will be found. Therefore if the teeth are ground on their front faces to helicoids which are the same as the helicoids of the initial cutting faces the effective contour will remain the same.

Taking up now the method of making the improved hob, it will be understood that the preliminary steps of turning the blank, cutting the grooves therein, etc., can be carried on in any usual or preferred way, these not of themselves constituting any part of the present invention. The invention relates particularly to the method of shaping the blank to provide a series of distorted elemental contours which will cut a correct composite thread contour.

Inasmuch as the method is in part similar to that presented in my said application Serial No. 268,350, I will here set forth only the preferred form of the method, but it will be understood that the method may be varied, particularly in the ways described in the said application, without departing from the spirit of the invention.

In practising the method use is preferably made of a preliminary rotating milling cutter which is used to form the shape of the successive sections of the hob. In Figs. 8 and 9 I have shown a preliminary milling cutter R of the general type which may be used. This preliminary cutter R is provided with longitudinal teeth 18 having grooves 19 between them, the teeth and grooves being parallel with the axis. The teeth 18 have cutting faces 20 conforming to planes intersecting the axis. Each cutting face 20 has a contour which is the same as the effective contour of one section of the hob, but which is reversely positioned, the points $4^r, 5^r, 6^r, 6^r, 5^r$ and $4^r$ of the cutter contour corresponding respectively to the points 4, 5, 6, 6, 5 and 4 of the hob contour.

In Figs. 10 and 11 I have shown the cutter R being used for shaping a blank A′ in an attempt to form a section of the hob A. It will be understood that the cutter R is rapidly rotating in the direction indicated by the arrow thereon; that the blank A′ is slowly rotating in the direction indicated by the arrow thereon; and that relieving is effected preferably by moving the preliminary cutter bodily toward the axis of the blank, as indicated by the vertical arrow, and then bodily away from the axis of the blank in the opposite direction. The downward or inward relieving movement is so timed that the resulting relief on the blank will conform to spirals of Archimedes. The cutter R is moved slowly downward during the cutting of each tooth and then is rapidly moved upward between the teeth to position it for the cutting of the next tooth. The preliminary cutter is made with as small a diameter as possible in order to permit it to follow the relief of one tooth without interfering with or cutting into the outline of the next tooth.

As shown in Fig. 11, the cutter R and the blank have been so adjusted that the teeth of the rotating cutter will mill the initial point 4 of the tooth of the blank A′ to the required distance from the axis. The downward movement of the cutter R in timed relation to the slow rotation of the blank A′ causes the cutter to take a cut which gradually increases in depth at the successive points back of the part 4, the outer curve of the tooth being substantially that represented by 7′ in Fig. 11. Inasmuch as the preliminary cutter R was made with an effective contour, $4^r, 5^r, 6^r, 6^r, 5^r, 4^r$, which is the same as the predetermined contour to be cut by the hob A, this cutter R will mill a similar contour on the blank A′. The blank therefore will have at an axial or approximately axial plane of intersection such as 12—12, a shape 14′, 15′, 16′, 16′, 15′, 14′, which is the same as the predetermined contour as shown by dotted lines in Fig. 12. The point 4′ of the elemental contour instead of being at the same distance from the axis as the point 4 is at a less distance, and all intermediate points 5′, 6′, 6′, 5′, are also at incorrect distances from the axis. If the hob were to be used it would, because of these varying and incorrect distances, cut a distorted contour as shown by full lines in Fig. 12.

Figs. 13 and 14 show a preliminary milling cutter S which is somewhat similar to the cutter R shown in Figs. 8 and 9. The cutter S is provided with longitudinal teeth 21 having grooves 22 between them. The front cutting faces 23 of the teeth, instead of being parallel with the axis, are beveled by grinding or otherwise to form helicoidal surfaces in accordance with one step of my novel method. Preferably the cutter S has exactly the same number of teeth as the hob A. Figs. 15 and 16 show the preliminary cutter S diagrammatically, there being a smaller number of teeth and the inclination of the cutting faces and the relief being increased. The cutter S has at any axial plane of intersection such as 17—17, a shape which is the same or approximately the same as the predetermined thread contour, as shown by dotted lines in Fig. 17. The shape has points $4^s, 5^s, 6^s, 6^s, 5^s$ and $4^s$ corresponding respectively to the points $4^r, 5^r, 6^r, 6^r, 5^r$ and $4^r$ of the cutter R shown in Figs. 8 and 9, and also corresponding respectively to the points 4, 5, 6, 6, 5 and 4 on the effective contour of the hob A.

Each cutting face of the preliminary cutter S, after being ground or otherwise beveled, is helicoidal and preferably has a degree of inclination which is the same as that of the cutting faces of the hob A. When this is the case, as shown, the helix for the preliminary cutter S, along which travels the generatrix of the helicoid, has the same longitudinal pitch as has the corresponding helix for the hob A. For reasons already stated the preliminary cutter is preferably much smaller in diameter than the hob and when this is the case, as shown in the drawings, there is an apparent difference in the helicoidal surfaces. While the helicoids are in reality the same, being determined by the same or similar directrices, the actual angle of inclination is less for the preliminary cutter S than for the hob A because of the smaller diameter. It is important that the direction of inclination of the cutting faces be the same for the preliminary cutter as for the hob. If the hob is to have left-hand helicoids as shown the preliminary cutter must also have left-hand helicoids; or if the hob is to have right-hand helicoids the preliminary cutter must have right-hand helicoids.

Each tooth of the preliminary cutter has a degree of relief which is preferably the same as that of the hob. The decrease in radius for each angular increment of advance of the cutter S is the same as the decrease in radius for each angular increment of advance of the hob A. While the degrees of relief are the same, there is an apparent difference because of the smaller diameter of the cutter S.

As the result of the intersection of the helicoidal cutting face of each tooth of the cutter S with the spiral relief lines thereof, the outline or contour of the cutting face is distorted, as shown by full lines in Fig. 17. This distorted contour has points $14^s$, $15^s$, $16^s$, $16^s$, $15^s$ and $14^s$, all points $15^s$, $16^s$, $16^s$, $15^s$ and $14^s$ to the right of the point $4^s$ or $14^s$ being spaced outward from the respectively corresponding points $5^s$, $6^s$, $6^s$, $5^s$ and $4^s$ by progressively increasing distances. Inasmuch as the teeth of the preliminary cutter S are provided with helicoidal cutting faces having the same pitch as the helicoidal cutting faces of the teeth of the hob A and are provided with the same degree of relief as the teeth of the hob A, the extent of distortion is the same as that resulting from the milling operation shown in Figs. 10 and 11. The actual inclination of each cutting face of the cutter S is less by reason of the smaller diameter but the amount of relief is more for the same reason, and these differences exactly compensate for each other.

Figs. 18 and 19 are similar respectively to Figs. 10 and 11 and show the method of milling the shape of the hob section by means of the preliminary cutter S. In general the operation is similar to that shown in Figs. 10 and 11 the cutter being turned rapidly, the blank being turned slowly, and relieving movements of the cutter being effected in timed relation to the blank rotation. Fig. 18 shows the cut being started, the preliminary cutter S being so adjusted that the points $14^s$ on the teeth of the rotating cutter will engage the initial point 4 of the first tooth of the hob blank A. As the blank A is slowly turned and as the cutter S is fed downward in accordance with the relief the parts move to the position shown in Fig. 19, the distorted shape of the cutter S exactly compensating for the distortion which would otherwise have taken place in the shape of the hob section A as illustrated in Fig. 11. The cutter S cuts the hob section A so that when the hob is used it will generate the true contour, as shown by full lines in Fig. 7.

Referring to Figs. 18 and 19, it will be noted that the dot-and-dash line $f$—$f$ represents in a general way the direction of relative movement of the cutter S in forming the relieved outline of the tooth on the hob A. The angle of relief at the said mean relief line $f$—$f$ is $g$. As the cutter S is rapidly rotating, its plane of maximum depth of cutting will necessarily be perpendicular to the line $f$—$f$. Cutting to the maximum depth will therefore be effected at a plane such as $h$—$h$ perpendicular to the line $f$—$f$. The transverse shape of the tooth of the hob A will therefore be determined as the successive parts of the tooth pass the plane $h$—$h$. But when the hob A is afterward used in a thread milling operation it will cut to its maximum depth and determine the contour of the threads at a plane such as $i$—$i$ passing through the axis. Clearly the planes $h$—$h$ and $i$—$i$ are not, and cannot be parallel, there being the angle $g$ included between them. The depth distance $d$ of the hob measured along the plane $i$—$i$ is slightly greater than the depth distance $d'$ of the preliminary cutter measured along the plane $h$—$h$. Therefore a slight error of shape results from the fact that the shape is generated at the plane $h$—$h$ and used at the plane $i$—$i$. This error can be almost exactly corrected by shaping the preliminary cutter in the way to be described.

Fig. 20 shows a lathe tool V having exactly the predetermined contour which is to be finally cut by the hob A, this tool being used in a relieving lathe. The lathe tool V is formed with its top cutting face having a contour $4^v$, $5^v$, $6^v$, $6^v$, $5^v$, $4^v$, which is the same as the effective contour 4, 5, 6, 6, 5, 4 of the teeth of the hob A. The tool V is preferably set with its top cutting face in a plane at an angle such as $j$ to a plane $k$—$k$ through the axis of the preliminary cutter S, as indicated in Fig. 21. When the preliminary cutter S is being formed it is rotated in the direction of the arrow, the tool V being moved in and out, as indicated by the horizontal arrow, so as to follow the proper relief lines.

As before stated the depth $d$ of the contour measured along the plane $h$—$h$ will be slightly greater than the depth $d'$ measured along the plane $h$—$h$. In order to make the depth $d$ correct at the plane $i$—$i$, the depth $d'$ at the plane $h$—$h$ must be slightly decreased. In Fig. 21 the plane $k$—$k$ corresponds in a general way to the plane $h$—$h$, and by setting the tool at an angle, as indicated, the depth $d'$ of the contour at the plane $k$—$k$ is made slightly less than the full depth $d$ measured along the top plane of the tool V. From the foregoing description it will be seen that, by the method illustrated, the depth of the contour of the hob A at the plane $i$—$i$ is properly corrected.

In the case of U. S. standard threads having straight sides and flat tops and bottoms it is possible to make the necessary correction by using a special lathe tool V' as shown in Fig. 22. This tool has a contour with a slightly decreased depth $d'$ and a correspondingly increased angle $l$, as indicated. The tool V' when used is set with its top cutting face in a plane passing through the axis of the hob as shown in Fig. 23.

Figs. 24 and 25 are fragmentary front and end views respectively of a hob blank in which one circumferential groove has been milled. The cutter S is shown in operative relation with the hob blank, being at the side thereof instead of at the top thereof as in Figs. 18 and 19. The cutter serves to cut one of the elemental contours on the blank, that is, it serves to cut the circumferential grooves of one set, the operation being the same as that shown in Figs. 18 and 19. As shown, the cutter S is in its outer operative position and is about to move inward to cut the relief on the tooth which has just come into engagement with it.

When the circumferential grooves of one set have been cut, relative longitudinal movement must be effected to position the cutter to cut the grooves of the next set at the proper distance from the first grooves, this distance being exactly equal to the longitudinal pitch of the threads to be milled by the hob. This relative movement can be effected by temporarily withdrawing the cutter, moving it endwise and then restoring it to operative position. This feature of the method is somewhat similar to what is set forth in my aforesaid application Serial No. 326,875. Fig. 26 shows the cutter thus moved.

I have stated that the cutter S is reciprocated in timed relation with the rotation of the hob blank. This relation is definite while the cutter is cutting the grooves of any given set, but when the cutter is moved endwise into position to cut the grooves of another set the relationship must be varied in accordance with the changing angular positions of the outer edges of the cutting faces. Fig. 26 shows the hob blank with the engaged tooth in the same position as in Fig. 24, but on account of the inclination of the cutting face 3 the said face is too far advanced with respect to the cutter and is not in the proper position for the starting of the cut. If the same relationship had been maintained between the rotation of the hob blank and the reciprocation of the cutter, the cutter would be in the same outermost operative position which it occupied in Figs. 24 and 25, thus leaving it out of engagement with correct relief lines of the blank by a distance $m$, as shown in Fig. 27. Obviously, the relationship between the cutter and the blank must be varied in order to enable the cutter to cut the necessary relief and at the same time maintain the correct thread contour. Not only must the elemental contour for each section be correct but the contours for the several sections must be properly related so as to provide a correct composite contour. For each section of the hob the required variation in the relationship may be effected by relatively advancing the cutter reciprocation in proportion to the movement of the cutter along the blank from one position to the next, or it may be effected by relatively retarding the rotative movement of the blank in proportion to the cutter movement. In either case the result is to maintain the cutter and the blank in the proper relationship as the cutter is moved longitudinally, and the relative timing is so varied that the cutter always engages the front edge of the tooth when the cutter is in the outer operative position, as shown in Fig. 28. In this figure the blank is shown in the same position as in Fig. 27, but the cutter has been moved inward a distance $m$ to properly engage the blank. As the blank rotates the cutter follows the correct lines of relief.

It is usually preferable to go over the blank two or more times taking roughing and finishing cuts. This however is a matter of detail that can be varied in accordance with circumstances.

The amount of correction required for the preliminary cutter S, as shown in Figs. 20 to 23, is dependent upon the relief angle of the final hob at the pitch radius thereof. In Figs. 29, 30 and 31 respectively I have shown a section of one tooth of each of three hobs, A, $A^1$ and $A^2$. The outside radius of the hob A is indicated as $n$, and the pitch radius is indicated as $o$. As already explained in connection with Figs. 18 and 19, the mean relief line of the hob A is $f$—$f$, the corresponding relief angle being $g$. The radial plane of the hob is $i$—$i$ and the plane at which the maximum depth of cutting occurs is $h$—$h$. The angle $g$ is included between the two planes $i$—$i$ and $h$—$h$.

The hob $A^1$ shown in Fig. 30 is similar to the hob A except that it has a smaller radius. The thread contour is the same and the depth $d$ is the same. The outside radius of the hob is $n^1$ and the pitch radius is $o^1$. Because of the smaller radius, the mean relief line $f^1$—$f^1$ is more sharply inclined, and the angle $g^1$ is considerably greater than the angle $g$. It will therefore be seen that for the hob $A^1$ with the greater angle $g^1$, a different correction would be required than that shown in Figs. 20 to 23.

The hob $A^2$, shown in Fig. 31, has the same outside diameter $n$ as the hob A. This hob, however, is for a smaller thread contour, and the depth of the contour is $d^2$. The pitch radius is $o^2$, which is somewhat greater than the pitch radius $o$. Therefore the mean relief line $f^2$—$f^2$ is less sharply inclined and the angle $g^2$ is less than the angle $g$. For this hob also the correction shown in Figs. 20 to 23 is incorrect. It will therefore be seen that for different pitch diameters of the hob different corrections must be made.

In practical work it is highly desirable to avoid such different corrections as would be required for the different hobs such as A, $A^1$ and $A^2$. It is preferable to standardize the corrections so that the angle $j$, as shown in Fig. 21, or the angle $l$, as shown in Fig. 22, can be always kept the same for cutting hobs for various thread sizes or pitches. In order to make possible the standardization of the correction of the preliminary cutter, I prefer to adopt a standard pitch radius, as indicated in Figs. 32 to 34. In these views are shown three hobs $A^3$, $A^4$ and $A^5$, adapted for different thread pitches and having different depths $d^3$, $d^4$ and $d^5$, but all having the same pitch radius $o$, this being the same as that of the hob A. The outside radii $n^3$, $n^4$ and $n^5$ vary, as indicated, but this is immaterial. The relief angle at the pitch radius is always the same, this being $g$, as indicated. The angle $g$ being always the same, the corrections as shown in Figs. 20 to 23 can be made in a predetermined standard manner, the angle $j$ or the angle $l$ being the same for all of the hobs.

I do not limit myself to a single standard pitch radius, as it may be desirable to select two or more such radii one for coarse pitch hobs and another for fine pitch hobs.

Difficulty is frequently encountered in attempting to mill a hob in the way illustrated. As already stated, the preliminary milling cutter is made as small as possible in order to avoid interference with the front of one tooth while finishing the back of the preceding tooth. Frequently, however, it is impossible to avoid such interference, particularly when there is considerable depth of tooth contour, or when the cutting faces are sharply inclined, or when the degree of relief is large. In such cases it is necessary to make use of a lathe cutter or tool which can be quickly withdrawn and which of course has no parts located beyond the cutting plane, as is the case with a rotating milling cutter. The lathe tool has the additional advantage that no correction is required, as shown in Figs. 20 to 23. When a lathe tool is to be used the method is similar to that which is already described except that certain supplemental steps are interposed. A preliminary cutter is constructed as before described and is used to form the proper distorted shape on a lathe tool and then this lathe tool having the distorted shape is used to cut the final cutter.

In following this modified method, a preliminary milling cutter S' is used and, as shown in Fig. 35, this cutter may be similar to the cutter S already described. The cutter S' differs from the cutter S in that no correction is made. This cutter S' is used to mill an intermediate tool W providing the said tool at its cutting face 24 with a distorted contour which is the same as the effective contour of the cutter S'. This distorted contour is illustrated in the plan view in Fig. 36, the contour having points $14^w$, $15^w$, $16^w$, $16^w$, $15^w$ and $14^w$ corresponding respectively to the points $14^s$, $15^s$, $16^s$, $16^s$, $15^s$ and $14^s$ of the effective contour of the cutter S'. It will be observed that the tool W is formed without relief, it being fed perpendicularly to its cutting face 24, as indicated by the arrow in Fig. 35.

The intermediate tool W is used, as shown in Fig. 37, for cutting a lathe tool X. The tool X has a cutting face 25 and has its front face 26 inclined with respect to the cutting face to provide the necessary relief. The tool W is set with its cutting face 24 parallel with the cutting face 25 of the tool X, and relative reciprocation is then effected along lines parallel with the front face 26. The result is that the cutting face 25 is formed with a distorted contour which is exactly the same as the distorted contour of the face 24 of the tool W. This distorted contour is shown in Fig. 38 and it has points $14^x$, $15^x$, $16^x$, $16^x$, $15^x$ and $14^x$ corresponding respectively to the points $14^w$, $15^w$, $16^w$, $16^w$, $15^w$ and $14^w$ of the cutter W.

Fig. 39 is a view similar to Fig. 25 and shows the tool X being used for shaping one set of grooves of the hob A. It will be understood that the blank is rotated as indicated by the arrow and that the cutter X is moved inward and outward in timed relation to the rotation to provide the relief. The distortion of the shape of the tool X is just sufficient to offset the distortion which would otherwise take place in the hob A, and the result is that the hob A is formed with the correct effective contour. Fig. 40 is a view similar to Fig. 28 and shows the changed relationship between the cutter and the blank that is necessary for cutting a second set of grooves, as fully explained in connection with Fig. 28.

In using a lathe tool it is necessary to take a large number of cuts. This can be done by going over the blank from end to end repeatedly or by feeding the tool gradually inward while cutting a single set of grooves, the blank being turned through several revolutions before the tool is moved for the next set of grooves. It may sometimes be desirable to rough out the blank with a milling cutter and then take the finishing cut with a lathe tool.

The method involving the use of a lathe tool is presented in my copending application for methods of making thread milling hobs, Serial No. 274,531, filed on even date herewith.

In my copending application for relieving machines, Serial No. 201,338 filed November 10th, 1917, I have presented a machine well adapted for the carrying out of the method. But so far as the method is concerned the machine may be widely varied, and in Figs. 41 and 42 I have illustrated diagrammatically the essential parts of a very simple machine which might be used. As illustrated, 27 is a mandrel upon which is carried a hob blank A. Suitable means are provided for supporting and rotating the mandrel. Longitudinally movable along ways 28, 28 is a carriage 29 carrying a transversely movable slide 30 upon which is mounted the preliminary milling cutter S or lathe tool. I have shown a cutter S mounted on the slide but it will be understood that a tool X may be substituted. As shown the cutter S is provided with suitable means such as the belt wheel 31 for rotating it. Preferably there is an intermediate slide 32 by means of which preliminary adjustments may be effected.

A cam 33 is splined to a shaft 34 which is rotatably mounted on the carriage 29. The cam 33 has as many lobes as the cutter A has teeth. When the slide 30 moves longitudinally with the carriage 29 the cam 33 moves along the shaft, the shaft itself being fixed against longitudinal movement. A finger 35 secured to the slide 30 engages the cam and a spring 36 is provided for pressing the slide 30 outward, thus holding the finger 35 against the cam. Suitable means, not fully shown, are provided for rotating the shaft 34 in timed relation with the mandrel 27, the shaft being given one complete rotation for each complete revolution of the mandrel and of the blank A. The groove or keyway 37 of the shaft 34 is helical in form and has the same degree of inclination as the teeth of the blank A. The result is that when the cutter S is moved longitudinally of the blank from one position to the next the cam 33 is moved along the shaft 34. On account of the helical keyway the cam not only partakes of the normal rotative movement of the shaft but is given a supplemental rotative movement, this supplemental movement being exactly correct in amount to cause the cutter, when in its outermost operative position to each reciprocation, to engage the front edge of a tooth of the hob.

In operation a blank A is put in place as shown, this blank having previously been roughened out and longitudinally grooved in any usual or preferred way. By means of the slide 32 the cutter S is adjusted into engagement with the blank at its right-hand end and the movement of the machine is started. The blank A rotates and the cutter S is given a reciprocating movement to effect the relief. This is continued until the blank has made a complete revolution, thus effecting the cutting of one set of grooves. Then the carriage 29 is moved along the ways 28, 28 a distance equal to the required pitch, the cutter being in the meantime withdrawn, if necessary, by moving the slide 32 relatively to the slide 30. Inasmuch as the cam 33 moves longitudinally along the shaft 34 when the carriage and the cutter are moved, the reciprocating and relieving movements of the cutter are slightly advanced, thus causing the cutter to engage the blank at the proper times, notwithstanding the changed positions of the cutting faces as the result of the inclination thereof.

It will be seen that by providing a preliminary cutter S or tool X having the correct elemental contour and by properly moving the cutter or tool from time to time to effect spacing, it is possible to use this machine to make a hob having any desired composite contour.

What I claim is:

1. The herein described method of shaping a relieved milling cutter having helicoidal cutting faces adapted to cut a predetermined composite contour consisting of a number of equal elemental contours arranged at uniform distances, the method consisting in axially rotating a blank having teeth with helicoidal cutting faces, in providing and positioning a cutter having a distorted effective contour whereby it is adapted to correctly cut one of the said elemental contours, in moving the cutter toward and from the blank axis during the cutting action in timed relation to the blank rotation to effect relieving, in moving the cutter longitudinally of the blank after the cutting action to position it for cutting another of the said elemental contours, in varying the timed relation of the relieving movements in proportion to the said longitudinal movement and in accordance with the inclination of the helicoidal cutting faces, and in repeating the said series of cutter movements until the final milling cutter has been shaped with the required number of elemental contours.

2. The herein described method of shaping a relieved milling cutter having helicoidal cutting faces adapted to cut a predetermined composite contour consisting of a number of equal elemental contours arranged at uniform distances, the method consisting in axially rotating a blank having teeth with helicoidal cutting faces, in providing and positioning a preliminary rotating milling cutter having a distorted effective contour whereby it is adapted to correctly cut one of the said elemental contours, in moving the milling cutter toward and from the blank axis during the cutting action in timed relation to the blank rotation to effect relieving, in moving the milling cutter longitudinally of the blank after the cutting action to position it for cutting another of the said elemental contours, in varying the timed relation of the relieving movements in proportion to the said longitudinal movement and in accordance with the inclination of the helicoidal cutting faces, and in repeating the said series of cutter movements until the final milling cutter has been shaped with the required number of elemental contours.

3. The herein described method of shaping a relieved milling cutter having helicoidal cutting faces adapted to cut a predetermined composite contour consisting of a number of equal elemental contours arranged at uniform distances, the method consisting in axially rotating a blank having teeth with helicoidal cutting faces, in forming a preliminary milling cutter having at axial planes of intersection a shape the same or approximately the same as one of the said elemental contours and having its teeth provided with helicoidal cutting faces with the same degree of inclination as the cutting faces of the final cutter and provided with the same degree of relief as the teeth of the final cutter, in positioning the preliminary cutter in operative relation to the blank to cut one of the said elemental contours, in moving the cutter toward and from the blank axis during the cutting action in timed relation to the blank rotation to effect relieving, in moving the cutter longitudinally of the blank after the cutter action to position it for cutting another of the said elemental contours, in changing the timed relation of the relieving movement in proportion with the said longitudinal movement and in accordance with the inclination of the helicoidal cutting faces, and in repeating the said series of cutter movements until the final milling cutter has been shaped with the required number of elemental contours.

4. The herein described method of shaping a relieved milling cutter having helicoidal cutting faces adapted to cut a predetermined composite contour consisting of a number of equal elemental contours arranged at uniform distances, the method consisting in axially rotating a blank having teeth with helicoidal cutting faces, in forming a preliminary milling cutter having its teeth provided with helicoidal cutting faces with the same degree of inclination as the cutting faces of the final cutter and provided with the same degree of relief as the teeth of the final cutter, in forming the said preliminary milling cutter with a shape approximately the same as one of the said elemental contours but differing slightly therefrom to an extent dependent on the angle of relief of the final cutter, in positioning the preliminary cutter in operative relation to the blank to cut one of the said elemental contours, in moving the cutter toward and from the blank axis during the cutting action in timed relation to the blank rotation to effect relieving, in moving the cutter longitudinally of the blank after the cutter action to position it for cutting another of the said elemental contours, in changing the timed relation of the relieving movement in proportion with the said longitudinal movement and in accordance with the inclination of the helicoidal cutting faces, and in repeating the said series of cutter movements until the final milling cutter has been shaped with the required number of elemental contours.

5. The herein described method of shaping a relieved hob for milling threads of a predetermined standard contour and having helicoidal cutting faces, the method consisting in axially rotating a blank having teeth with helicoidal cutting faces, in providing and positioning a cutter having a distorted effective contour whereby it is adapted to correctly cut a single thread contour in moving the cutter toward and from the blank axis during the cutting action in timed relation to the blank rotation to effect relieving, in moving the cutter longitudinally of the blank after the cutting action through the pitch distance between two threads to position it for cutting another thread contour, in varying the timed relation of the relieving movements in proportion to the said longitudinal movement and in accordance with the inclination of the helicoidal cutting faces, and in repeating the said series of cutting movements until the hob has been shaped with the required number of thread contours.

6. The herein described method of shaping a relieved hob for milling threads of a predetermined standard contour and having helicoidal cutting faces, the method consisting in axially rotating a blank having teeth with helicoidal cutting faces, in providing and positioning a preliminary rotating milling cutter having a distorted effective contour whereby it is adapted to correctly cut a single thread contour, in moving the milling cutter toward and from the blank axis during the cutting action in timed relation to the blank rotation to effect relieving, in moving the milling cutter longitudinally of the blank after the cutting action through the pitch distance between two threads to position it for cutting another thread contour, in varying the timed relation of the relieving movement in proportion to the said longitudinal movement and in accordance with the inclination of the helicoidal cutting faces, and in repeating the said series of cutter movements until the final hob has been formed with the required number of thread contours.

7. The herein described method of shaping a relieved hob for milling threads of a predetermined standard contour and having helicoidal cutting faces, the method consisting in axially rotating a blank having teeth with helicoidal cutting faces, in forming a preliminary milling cutter having at axial planes of intersection a shape the same or approximately the same as a single thread contour and having its teeth provided with helicoidal cutting faces with the same degree of inclination as the cutting faces of the hob and provided with the same degree of relief as the teeth of the hob, in positioning the preliminary cutter in operative relation to the blank to cut a single thread contour, in moving the cutter toward and from the blank axis during the cutting action in timed relation to the blank rotation to effect relieving, in moving the cutter longitudinally of the blank after the cutter action through the pitch distance between two threads to position it for cutting another thread contour, in changing the timed relation of the relieving movement in proportion with the said longitudinal movement and in accordance with the inclination of the helicoidal cutting faces, and in repeating the said series of cutter movements until the hob has been shaped with the required number of thread contours.

8. The herein described method of shaping a relieved hob for milling threads of a predetermined standard contour and having helicoidal cutting faces, the method consisting in axially rotating a blank having teeth with helicoidal cutting faces, in forming a preliminary milling cutter having its teeth provided with helicoidal cutting faces with the same degree of inclination as the cutting faces of the hob and provided with the same degree of relief as the teeth of the hob, in forming the preliminary milling cutter with a shape approximately the same as a single thread contour but differing slightly therefrom to an extent dependent on the angle of relief of the hob, in positioning the preliminary cutter in operative relation to the blank to cut a single thread contour, in moving the cutter toward and from the blank axis during the cutting action in timed relation to the blank rotation to effect relieving, in moving the cutter longitudinally of the blank after the cutter action through the pitch distance between two threads to position it for cutting another thread contour, in changing the timed relation of the relieving movement in proportion with the said longitudinal movement and in accordance with the inclination of the helicoidal cutting faces, and in repeating the said series of cutting movements until the hob has been shaped with the required number of thread contours.

9. The herein described method of shaping a relieved hob for milling threads of a predetermined standard contour and having helicoidal cutting faces, the method consisting in axially rotating a blank having teeth with helicoidal cutting faces, in forming a preliminary milling cutter having its teeth provided with helicoidal cutting faces with the same degree of inclination as the cutting faces of the hob and provided with the same degree of relief as the teeth of the hob, in forming the preliminary milling cutter with a shape approximately the same as a single thread contour but differing slightly therefrom in that the thread depth is decreased and the thread angle correspondingly increased, in positioning the preliminary cutter in operative relation to the blank to cut a single thread contour, in moving the cutter toward and from the blank axis during the cutting action in timed relation to the blank rotation to effect relieving, in moving the cutter longitudinally of the blank after the cutter action through the pitch distance between two threads to position it for cutting another thread contour, in changing the timed relation of the relieving movement in proportion with the said longitudinal movement and in accordance with the inclination of the helicoidal cutting faces, and in repeating the said series of cutter movements until the hob has been shaped with the required number of thread contours.

10. The herein described method of shaping a series of similar relieved hobs for milling threads of respectively different predetermined standard contours and each having helicoidal cutting faces, the method consisting in providing a series of similar blanks each having teeth with helicoidal cutting faces, in forming a series of preliminary milling cutters each having its teeth provided with helicoidal cutting faces with the same degree of inclination as the cutting faces of the hobs and provided with the same degree of relief as the teeth of the hobs, in forming the respective preliminary milling cutters with shapes each approximately the same as a single thread contour of one of the hobs but each differing slightly therefrom to an extent dependent on the angle of relief of the hobs, in axially rotating the blanks, in positioning each preliminary cutter in operative relation to a blank to cut a single thread contour at a predetermined pitch radius which is the same for all of the different hobs, in moving each cutter toward and from the blank axis during the cutting action in timed relation to the blank rotation to effect relieving, the said timed relation being the same for all of the hobs, in moving each cutter longitudinally of the blank after the cutter action through the pitch distance between two corresponding threads to position it for cutting another of the said thread contours, in changing the timed relation of the relieving movement in proportion with the said longitudinal movement and in accordance with the inclination of the helicoidal cutting faces, and in repeating the said series of cutter movements for each hob until the hob has been shaped with the required number of thread contours.

In testimony whereof I hereto affix my signature.

FRIEDERICH MÜLLER.